United States Patent [19]
Woll et al.

[11] 3,949,254
[45] Apr. 6, 1976

[54] WINDING FOR DYNAMOELECTRIC MACHINE

[75] Inventors: Richard F. Woll; Clifford P. Willby, both of Williamsville, N.Y.

[73] Assignee: Westinghouse Electric Corporation, Pittsburgh, Pa.

[22] Filed: Feb. 25, 1974

[21] Appl. No.: 446,037

[52] U.S. Cl. .............................. 310/198; 310/225
[51] Int. Cl.² .......................................... H02K 3/00
[58] Field of Search ........... 310/68, 68 D, 179, 189, 310/180, 188, 184, 198, 202–208; 322/90; 318/224–226, 496

[56] References Cited
UNITED STATES PATENTS

| | | | |
|---|---|---|---|
| 1,267,232 | 5/1918 | Korthals-Altes | 310/202 |
| 1,447,164 | 2/1923 | Hague | 310/202 |
| 1,711,979 | 5/1929 | Weinert | 310/202 |
| 1,832,700 | 11/1931 | Gay | 310/198 |
| 2,397,183 | 3/1946 | Kilgore | 310/179 |
| 2,414,571 | 1/1947 | Veinott | 310/198 |
| 2,575,716 | 11/1951 | Kilgore | 318/226 |
| 3,308,363 | 3/1967 | Rawcliffe | 318/224 |
| 3,391,319 | 7/1968 | Quinn | 318/225 |

Primary Examiner—R. Skudy
Attorney, Agent, or Firm—G. H. Telfer

[57] ABSTRACT

A winding is provided for dynamoelectric machines having a plurality of pole groups disposed to form a poly-phase winding. Each pole group consists of a number of multi-turn coils divided into two subgroups with the coils of one subgroup having one more turn than the coils of the other subgroup. Field strengths can thus be obtained equivalent to what could be produced by coils having fractional numbers of turns intermediate between the actual numbers of turns of the coils of the two subgroups, the effective number of turns being determined by the relative number of coils in the two subgroups of each pole group.

5 Claims, 2 Drawing Figures

WINDING FOR DYNAMOELECTRIC MACHINE

BACKGROUND OF THE INVENTION

The present invention relates to windings for dynamoelectric machines such as induction motors, and more particularly to windings for motors of relatively large horsepower and low voltage ratings.

While the usefulness of the present invention is not necessarily limited to any particular type or size of machine, it is particularly suitable for induction motors of relatively large horsepower and low voltage. In motors with horsepower ratings of about 200 horsepower or more at 230 volts, or 400 horsepower or more at 460 volts, the flexibility of design is severely limited because the field strength of the winding can be adjusted only in quite large steps. The reason for this is that windings for motors in these sizes, even with the maximum number of parallel branches possible for a given number of poles, require a relatively small number of turns per coil such as from two or six or seven turns. The smallest change in field strength that can be obtained in the design of such a winding by adjusting the number of turns per coil is therefore relatively large. For example, if a winding having three turns per coil does not give the desired field strength, the smallest change that can be made with a conventional winding design is the subtraction or addition of one turn per coil, so that the coils would have to be changed either two or four turns. A two-turn coil would provide a 50 percent stronger field than the original three turns while a four-turn coil would yield a 33 percent weaker field. Such an adjustment, in either direction, is a very coarse adjustment and makes it very difficult or impossible to obtain the desired field strength in many cases, thus undesirably limiting the flexibility of design.

SUMMARY OF THE INVENTION

The present invention provides a winding arrangement which makes it possible to design a polyphase winding of the general type described above in which the field strength of the pole groups can be adjusted in the design of the winding in increments corresponding to fractional turns per coil instead of a complete turn. This result is accomplished by dividing the coils of each pole group into two subgroups and by winding the coils of one subgroup in each pole group of the winding with one more turn than the coils of the other subgroup. The effect of this is to produce a pole group having a field strength corresponding to coils with a fractional number of turns intermediate between the actual numbers of turns of the coils, so that relatively small increments are thus obtainable between the two full turn numbers. In this way, the flexibility of design is greatly increased by making it possible to adjust the field strength in much smaller steps thaan has previously been possible, and with a balanced winding and normal flux distribution.

BRIEF DESCRIPTION OF THE DRAWING

The invention will be more fully understood from the following detailed description, taken in connection with the accompanying drawing, in which.

DESCRIPTION OF THE PREFERRED EMBODIMENT

Figure 1:
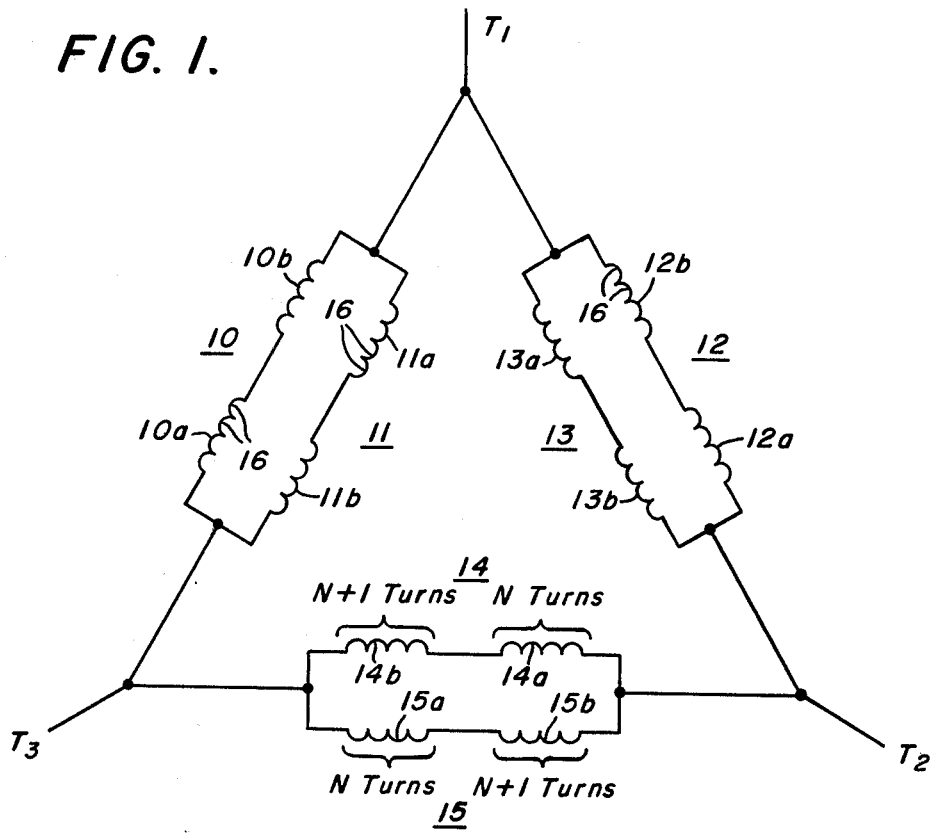
FIG. 1 is a schematic diagram of a typical winding embodying the invention.

The invention is shown in the drawing for the purpose of illustration embodied in a three-phase winding suitable for use as the stator or primary winding of an induction motor, although it could, of course, be used in any type of machine, such as a synchronous motor, where a rotating field is to be produced.

Figure 2:
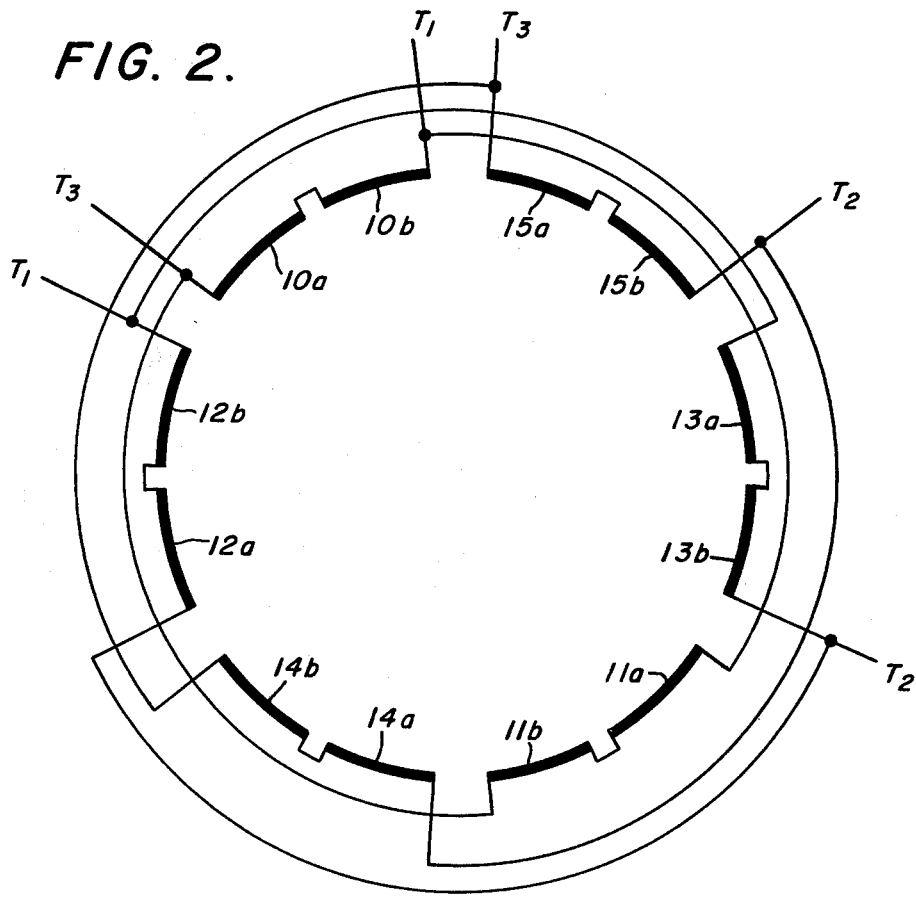
FIG. 2 is a connection diagram for the winding of FIG. 1.

The winding shown in the drawing is a three-phase, two-pole winding and consists of six pole groups 10, 11, 12, 13, 14 and 15. Each of the pole groups consists of a plurality of multi-turn coils and constitutes one pole of the winding. As shown diagrammatically in FIG. 2, the pole groups are disposed in the usual manner, and may be placed in the slots of a conventional stator core which has not been illustrated since it may be of any desired type. Each phase of the winding consists of two pole groups arranged to form poles of opposite polarity which are connected in parallel and physically placed opposite each other as shown in FIG. 2. Thus, one phase of the winding may comprise the phase groups 10 and 11 connected in parallel between the terminals T1 and T3 and placed directly opposite on the core. The second phase consists of the coil groups 12 and 13 connected in parallel between terminals T1 and T2, and the third phase of the winding consists of the pole groups 14 and 15 connected in parallel between terminals T2 and T3. The winding as illustrated is thus a two-parallel, delta-connected winding although it will be apparent that other winding arrangements and connections could be utilized.

As explained above, in the design of windings of this general type and especially for the larger horsepower ratings at relatively low voltages, the coils of which each pole group is made up have a relatively small number of turns. This often makes it difficult or impossible in designing such a winding to obtain the desired field strength, since the field strength can only be changed or adjusted in relatively large steps by adding or removing one full turn from each coil. With a relatively small number of turns per coil, the change of one full turn makes a very large step in field strength, and the flexibility of design is severely limited because the field strength can be adjusted only in these relatively coarse steps. The present invention provides a means for designing these windings with the equivalent of fractional turns per coil, so that intermediate steps are made possible between coils having integral numbers of turns, and a given winding design and can be adjusted to have a desired field strength which in many cases could not have been obtained with conventional windings.

In the illustrative embodiment shown in the drawing, which is intended for a 48-slot stator core, each of the pole groups consists of eight multi-turn coils diagrammatically indicated at 16 in FIG. 1. In accordance with the invention, half of the coils 16 of each pole group are wound with a given number of turns N and the other half of the coils 16 of each group are wound with one more turn so as to have N + 1 turns. In the illustrative embodiment, each of the coil groups 10 through 15 has a total of eight coils 16, and the coils of each group are divided into two subgroups designated 10a, 10b, 11a, 11b, etc., each of the subgroups containing four coils. The subgroups designated a contain coils of N turns while those designated b contain coils having N + 1 turns. Since the two subgroups of each pole group have the same number of coils, the effect is the same as though the entire pole group were made up of coils containing a half-turn, that is, coils having N + ½ turns. An intermediate step is thus made possible in the design of the winding between N turn coils and N + 1 turn coils, so that greater flexibility in design is achieved and the desired field strength can be approached much more closely in many cases than has previously been possible.

In the illustrative embodiment just described, the coils of each pole group are divided into two subgroups each having half the coils of the group. It is not necessary, however, for the two subgroups to have the same number of coils. Thus, each subgroup can have any number of coils from one to Y−1, where Y is the total number of coils per pole group, the other subgroup of each pole group having the remaining coils of the group. The effective number of turns per coil is then determined by the relative numbers of coils in the two subgroups of each pole group, the following numbers of effective turns per coil being obtainable:

$$N + \frac{1}{Y}, N + \frac{2}{Y}, N + \frac{3}{Y}, N + \frac{Y-1}{Y}$$

In this way, a range of fractional numbers of effective turns per pole is available and correspondingly fine adjustments of field strength can be made in a design by adjusting the numbers of coils in the subgroups.

In order to maintain balance in the winding and uniform flux distribution, the windings are preferably symmetrically arranged in the manner shown in FIGS. 1 and 2. The two subgroups of each pole group are placed in adjacent slots and connected in series, with the order of the two subgroups of each pole group reversed in the two groups of each phase as shown in FIG. 1. As can be seen from the connection diagram of FIG. 2, this results in a symmetrical and balanced winding. With the particular winding arrangement shown in the drawing disposed in a 48-slot stator core, the pole pitch is 24 slots, and to obtain the desired winding symmetry and balance with uniform flux distribution, the individual coils preferably have a throw of 12 slots, that is, half the pole pitch. This is a usual type of winding for two-pole machines so that the use of a half-pitch winding in this case involves no unusual difficulties. In some cases, particularly with a relatively large number of poles such as eight poles or more, a half-pitch winding may not be desirable and in such cases it is possible to use full-pitch coils. When this is done, the two subgroups in each pole group are not necessarily separated in the manner shown in the drawing, but in every case each pole group will have part of its coils wound with N turns and the other part would with N + 1 turns so that the result described is obtained whether half-pitch or full-pitch coils are used.

It will now be apparent that a winding arrangement has been provided for dynamoelectric machines which makes it possible to provide windings having field strengths corresponding to coils of a fractional number of turns but in a way that permits a balanced winding and normal winding and connecting operations. By using such windings, great flexibility in design is obtainable since the desired field strength can be more closely approximated than with previous winding designs where the increments between successive steps were limited to changes corresponding to one full coil turn. A particular embodiment of the invention has been shown and described for the purpose of illustration, but it will be understood that other arrangements and embodiments are possible and that the invention is applicable to windings having any desired number of poles and any number of coils as long as the coils of each pole group are divided into two subgroups.

What is claimed is:

1. A winding for a dynamoelectric machine comprising a plurality of pole groups disposed to form a polyphase winding, each of said pole groups including a plurality of multi-turn coils positioned adjacent each other to form one pole of one phase of the winding, the coils of each pole group being divided into two subgroups, and the coils of one subgroup of each pole group having one more turn than the coils of the other subgroup, each coil of both subgroups having an integral number of turns.

2. A winding as defined in claim 1 in which all of said subgroups have the same number of coils.

3. A winding as defined in claim 1 in which the two subgroups of each pole group have different numbers of coils.

4. A winding as defined in claim 1 in which the pole groups of each phase are connected in parallel and the subgroups of each pole group are connected in series, and the respective subgroups of each of the pole groups of each phase are symmetrically arranged within the winding.

5. A winding as defined in claim 1 in which all of said subgroups have the same number of coils and the pitch of the coils is one-half the pole pitch.

* * * * *